Jan. 2, 1940.  P. O. KROGH  2,185,345
AUTOMOBILE BODY ROOF FRAME STRUCTURE
Filed April 11, 1939
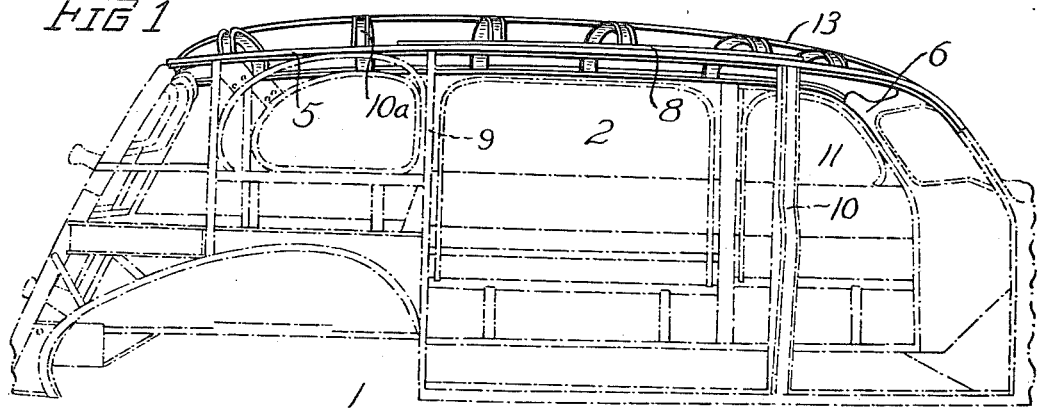
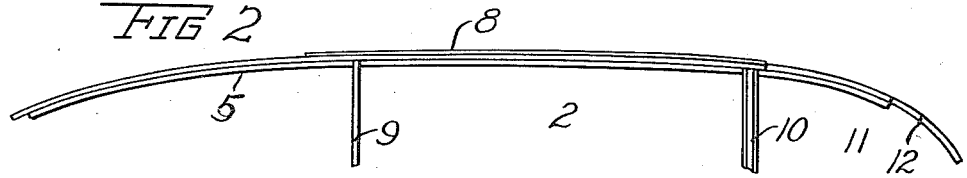
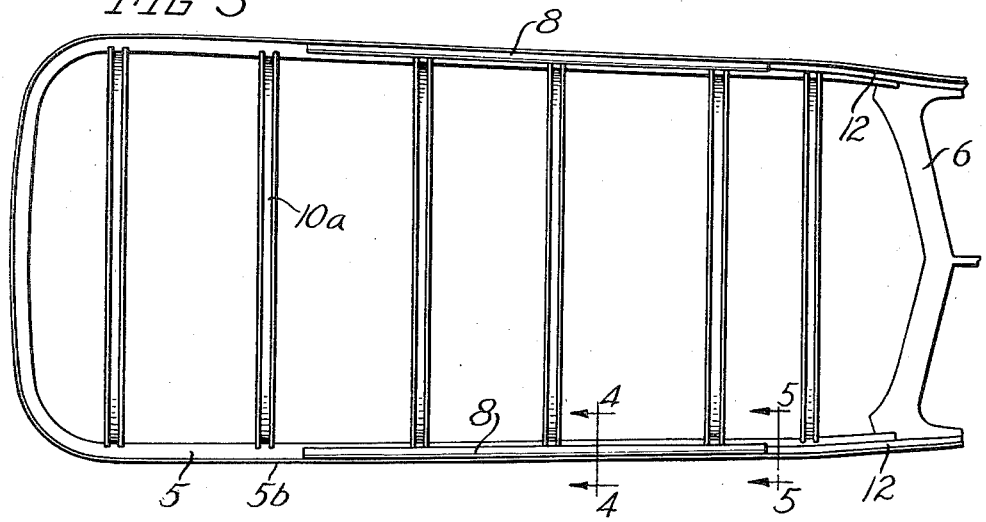
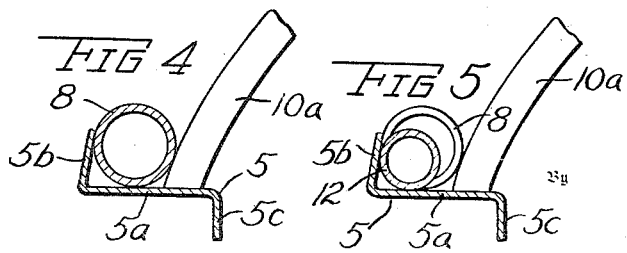
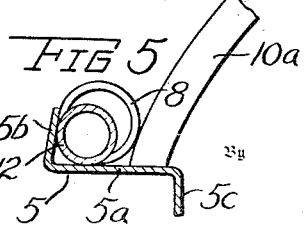
Inventor
Peter O. Krogh
Owen & Owen
Attorneys Patented Jan. 2, 1940

2,185,345

UNITED STATES PATENT OFFICE 2,185,345

AUTOMOBILE BODY ROOF FRAME STRUCTURE

Peter O. Krogh, Lima, Ohio, assignor to Superior Body Company, Lima, Ohio, a corporation of Ohio Application April 11, 1939, Serial No. 267,279

2 Claims. (Cl. 296—137)

This invention relates to body frames for automobiles of the closed type such as used in funeral cars, ambulances, or the like, having side door openings, and particularly to the roof structure of such frames.

In such structures, and particularly those used in connection with all-metal body frames, lightness, strength and durability are factors, and it has been a problem to provide a construction over the side door opening or openings which will be light and at the same time compact and strong to withstand the strains to which subjected during use of the vehicle.

The object of this invention is the provision of a roof frame for automobile bodies of the character described, of a simple, light, strong and durable portion over a door opening to withstand strains and stresses to which incident without reducing the head room of the opening.

The invention is fully described in the following specification, and one embodiment thereof illustrated in the accompanying drawing, in which—

Figure 1 is a side elevation of an automobile body frame, with the roof structure in which the invention particularly resides shown in full lines; Fig. 2 is a side edge view of the reinforced edge frame member of the roof structure; Fig. 3 is a top plan view of the roof frame structure, and Figs. 4 and 5 are enlarged sections on the lines 4—4 and 5—5, respectively, in Fig. 3.

Referring to the drawing, 1 designates the body frame structure of an automobile of the limousine type, such for instance as used in present-day ambulance and funeral cars, and particularly represents an all-metal or substantially all-metal frame structure having a side door opening 2 at one or both sides thereof.

The roof of such structure, in its present embodiment, includes around its edge a roof rail 5 extending rearward from each side edge of the front windshield frame structure 6 to the rear end of the body and continuing across the back. This rail is substantially Z-form in cross-section, having a horizontal body part 5ª, an upstanding outer edge flange 5ᵇ, inclined slightly inward from a perpendicular to the part 5ª, and a depending inner edge flange 5ᶜ. However, the relative angles of the parts 5ª, 5ᵇ and 5ᶜ may be changed to suit the contour of the roof desired.

The rail 5 over each side door opening 2 of the frame is provided with a hollow reinforcing bar 8, preferably tubular, which seats on the top of the rail part 5ª against the outer edge flange 5ᵇ, being welded thereto at suitable spaced intervals, and extending a distance at each end beyond the respective side door pillars 9 and 10 of the body frame. This enables a comparatively light form of roof rail to be used in the roof structure, and provides a strong and comparatively light reinforcement therefor over a broad door opening, the top of which is formed by the edge rail 5.

The side portions of the edge rail 5 are connected at suitable intervals by upwardly bowed cross ribs 10ª, preferably of channel form, the ends of which are electrically welded or otherwise suitably fixed to the inner edge portions of the rail part 5ª. The cross ribs, which terminate at the inner sides of the reinforcing bars 8, preferably have their end portions laterally abutting outwardly against such bars and welded thereto, as shown at Fig. 4.

If desired, the span of the roof rail 5 over each front door opening 11 of the body frame may be reinforced by a hollow bar 12, which may be smaller in diameter than the bar 8 at the side therewith and extends forward therefrom over such opening and is secured in the upper angle of the rail 5 the same as the bar 8. The roof frame, if desired, may have the cross ribs connected by one or more longitudinally extending strips 13 (Fig. 1).

It is apparent that I have provided an all-metal roof frame structure for automobile bodies, which is of simple, light and shallow form and reinforced over the door openings in a strong, durable, efficient and inexpensive manner without adding materially to the frame weight.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. An automobile body frame structure having a door opening in a side thereof, a metal roof rail extending across the opening and thereover, and having a horizontal portion and an upstanding outer flange, a hollow metallic bar formed independently of the rail and having its bottom abutting the horizontal part of the rail and its outer side abutting said upstanding flange and secured to one thereof, and bowed metallic cross ribs having ends secured to the horizontal portion of the flange and having their outer sides secured to the inner sides of the hollow bar, whereby a four point contact is had in all between the rail, and the hollow bar, and between the cross ribs, the bar, and the rail.

2. An automobile body frame structure having a door opening in a side thereof, a metal roof rail extending across the opening and thereover, and having a horizontal portion and an upstanding outer flange, a hollow metallic bar formed independently of the rail and having its bottom secured to the horizontal part of the rail and its outer side secured to said upstanding flange, bowed metallic cross ribs having ends secured to the horizontal portion of the flange and having their outer sides secured to the inner sides of the hollow bar, said frame also having a front door opening, and a second hollow metallic bar extending over the last-named opening and secured to the horizontal portion and to the upstanding flange of the rail and having an inner end disposed adjacent the front end of the first-named hollow bar.

PETER O. KROGH.